(No Model.)

M. WALKER.
FLEXIBLE PIPE JOINT.

No. 275,098. Patented Apr. 3, 1883.

Attest:
A. Barthel
Charles J. Hunt

Inventor:
Miriah Walker
by Atty Thos. S. Sprague

UNITED STATES PATENT OFFICE.

MICIAH WALKER, OF PORT HURON, MICHIGAN.

FLEXIBLE PIPE-JOINT.

SPECIFICATION forming part of Letters Patent No. 275,098, dated April 3, 1883.

Application filed November 20, 1882. (No model.)

*To all whom it may concern:*

Be it known that I, MICIAH WALKER, of Port Huron, in the county of St. Clair and State of Michigan, have invented new and useful Improvements in Flexible Pipe-Joints; and I do hereby declare that the following is a full, clear, and exact description thereof, reference being had to the accompanying drawings, which form a part of this specification.

The nature of this invention relates to certain new and useful improvements in the construction and operation of pipe-joints, by means of which pipe may be more easily and perfectly laid across streams or swampy places, where it is difficult to lay the pipe in place with rigid joints. For instance, in the construction of water-works in a town that is divided by a river, where it becomes necessary to lay the water-pipe across the bed of the stream, which is generally lower at the center or in mid-channel than nearer the banks, it has been usual to secure the pipes together in a sufficient number of lengths to cross the stream, such lengths being secured together by rigid joints when the pipe is laid across the stream, with its two ends resting upon the opposite banks, after which the ends are undermined, and in this way dropped below the frost-line and into or near the bed of the stream. This is always accompanied by more or less risk that the joints would become loosened, so as to leak.

The object of the present invention is to provide a method of coupling the joints so that the couplings will act somewhat in the manner of what is known in mechanics as a "ball-joint."

Figure 1:
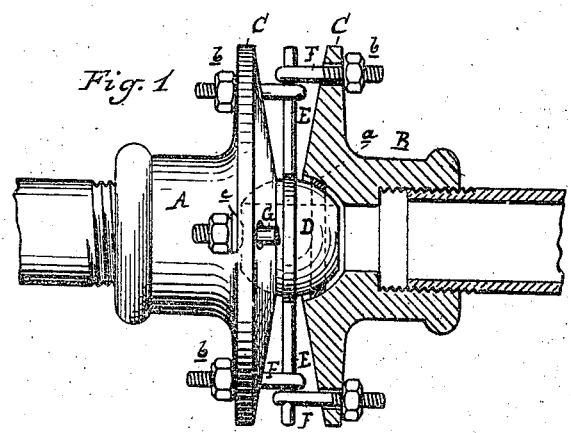
Figure 2:
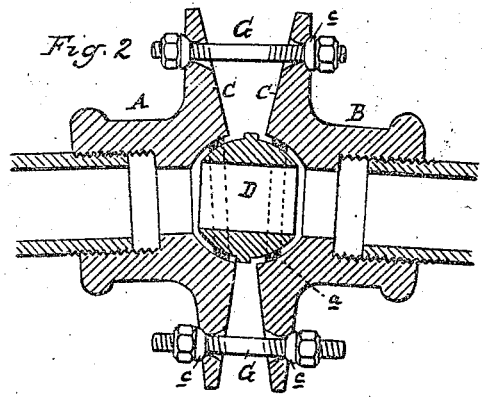

Figure 1 is a longitudinal central section through the center of one of my improved couplings. Fig. 2 is a similar section, taken at right angles to the one in Fig. 1.

In the accompanying drawings, which form a part of this specification, A and B each represent one-half of the pipe-coupling, the inner ends of each terminating in a flange, C, the inner face of each flange being spheroidal in shape, the bore through the same being enlarged to receive the packing *a* of soft metal.

D is the ball-joint, being a perfect sphere with portions cut off, and a bore through the same equal to the bore of the main parts of the coupling. Surrounding this ball-joint is what may be termed an "equatorial ring" centrally situated between the poles, and the object of this ring is that as the ball-joint is inserted, the one pole into the one part A of the coupling and the other into the opposite part B, the joints can only be turned a little way in either direction, while without the equatorial ring there would be a possibility of the ball so turning in the joint as to obstruct the flow through the coupling. Projecting from this ring upon the opposite sides are the arms E, the ends of which enter stirrups F, there being two stirrups on each of the arms, running in opposite directions through suitable holes in the flanges C, and the shafts of such stirrups, being threaded, are secured in place by suitable nuts, *b*, upon their ends outside of the flanges. This construction provides a flexible joint which may be readily lowered to place in the beds of streams, and which may be rendered rigid in any desired position after having been laid in place, if desired, by means of bolts G, two or more passing through both flanges. When these bolts are inserted and the couplings are upon an angle to each other the nuts upon the bolts would stand at a corresponding angle to the outer faces of the flanges, whereby a very unworkmanlike presentation would be had. To avoid this the bolt-holes are countersunk from the outside, and washers *c*, with convex faces, which enter the countersunk holes, adapt themselves, upon the principle of the ball-joint, to the angle or inclination, so that the nut, when screwed up against the washer, will present a fair and square surface to the same, as shown in the drawings.

I am aware that flexible pipe-joints of various kinds are known and have been patented; therefore I do not broadly claim a flexible pipe-joint; but

What I claim, and desire to secure by Letters Patent, is—

1. The combination of the two abutting ends of pipes with a centrally-apertured ball having an equatorial flange and means for securing the two ends of pipes together, substantially as described.

2. The combination, in a pipe-coupling, of a spherical centrally-apertured ball having radial arms and equatorial flanges, with the stirrups secured to the flanges of the coupling and the said arms, substantially as and for the purposes specified.

3. In a flexible pipe-joint, in combination with the two parts of the coupling, each part being provided with a soft-metal circular seat, the hollow ball, substantially as and for the purposes described.

4. A flexible pipe-joint consisting of the two parts of the coupling, the centrally-bored spherical ball, its arms and stirrups, the parts being constructed, combined, and operating substantially as and for the purposes set forth.

MICIAH WALKER.

Witnesses:
E. SCULLY,
O. J. HUNT.